United States Patent Office 3,644,378
Patented Feb. 22, 1972

3,644,378
PROCESS FOR PREPARING FORMAMIDES
Harry Louis Yale, New Brunswick, and Jelka Pluscec, East Brunswick, N.J., assignors to E. R. Squibb & Sons, Inc., New York, N.Y.
No Drawing. Filed June 25, 1969, Ser. No. 836,654
Int. Cl. C07d 31/50, 31/48
U.S. Cl. 260—294.8 F     3 Claims

ABSTRACT OF THE DISCLOSURE

An improved process for preparing compounds of the formula

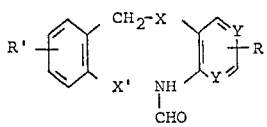

wherein X is oxy or thio; one Y is aza; the remaining Y is

R and R' are the same or different and represent hydrogen, halogen, lower alkyl, lower alkoxy, trifluromethyl, trifluoromethylmercapto, trifluoromethoxy or N,N-dimethylaminosulfonyl; and X' is chloro or bromo, is disclosed. These compounds are useful in the preparation of dihydropyridobenzoxazepines and dihydropyridobenzothiazepines.

---

In U.S. Pat. No. 3,123,614, granted Mar. 3, 1964, are disclosed various dihydropyridobenzoxazepines and dihydropyridobenzothiazepines including those of the Formula I:

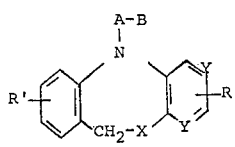

wherein A is a lower alkylene radical of at least two carbon atoms; B is a basic saturated nitrogen-containing radical of less than twelve carbon atoms; X is oxy or thio; one Y is aza and the remaining Y is

and R and R' are the same or different and represent hydrogen, halogen, lower alkyl, lower alkoxy, trifluoromethyl, trifluoromethylmercapto, trifluoromethoxy, or N,N-dimethylaminosulfonyl.

There is also disclosed in said patent a process for preparing compounds of the Formula I, entailing inter alia, the steps of converting compounds of the Formula IIa or IIb:

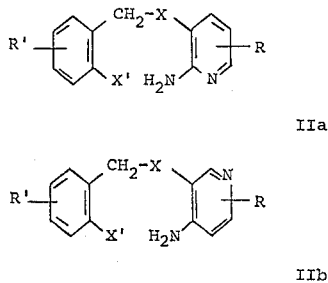

wherein X, R and R' are as hereinbefore defined, and X' is chloro or bromo, to compounds of the Formula IIIa and IIIb:

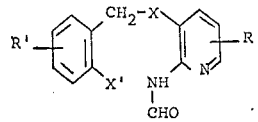

IIIa

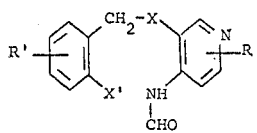

IIIb wherein X, X', R and R' are as hereinbefore defined.

It has now been found that if the reactions are carried out under the conditions disclosed in said patent and the compounds of Formula IIa and IIb are prepared as disclosed in said patent and converted to the compounds of Formula IIIa and IIIb by the method disclosed therein, the overall yield from the corresponding nitro compounds (compounds of Formula IIa and IIb with nitro substituted for the amino group) to the compounds of Formula IIIa and IIIb, is only about 8 to about 10%.

One reason for these low yields by the method previously disclosed is that when Compounds IIa and IIb are prepared from the nitro derivatives by reduction, e.g., with iron and hydrochloric acid, they are isolated as the hydrochloride salts and when the IIa and IIb are liberated from these salts by neutralization, e.g., by sodium formate or by sodium bicarbonate, the Compounds IIa and IIb are contaminated with large amounts (ca. 50%) of their stable tautomers, IVa or IVb:

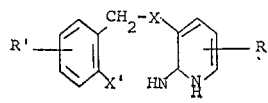

IVa

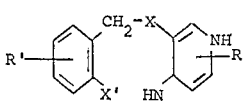

IVb

These latter tautomers do not yield IIIa or IIIb when heated under reflux even with a large excess of 98–100% formic acid. Furthermore, even with IIa and IIb competing reactions with formic acid under reflux are the formation of substantial amounts of the formic acid salts, and all attempts to convert these formic acid salts to IIa and IIb have been unsuccessful.

It has now been found that the tautomers, IVa or IVb present can be converted to IIa or IIb, respectively, by bringing into intimate contact by means of vigorous agitation a solution of the tautomeric mixtures of Compounds IIa and IVa or IIb and IVb, obtained following the reduction of the corresponding nitro compound as described above, in a solvent like diethyl ether or benzene, with strong aqueous alkali, e.g., sodium or potassium hydroxide in a concentration of 10 to 50%, for extended periods of time, e.g., one to four hours.

It has been further found that the yields of the desired compounds of the Formulas IIIa and IIIb can be substantially increased by altering the formylation step from that disclosed in said patent, by carrying out the reaction with formic acid under substantially anhydrous conditions in the presence of at least two equivalents of a condensation reagent, such as dicyclohexylcarbodiimide, diisopropylcarbodiimide, dimorpholinylcarbodiimide, carbonyldiimidazole, etc. The reaction is preferably carried out at a temperature below room temperature and optimally at about 5° C.

This is surprising since if only one equivalent of dicyclohexylcarbodiimide, for example, is used, only starting compounds of the Formula IIa or IIb are obtained. Furthermore, if, for example, acetic or propionic acid is used in place of the formic acid, with two equivalents of dicyclohexylcarbodiimide, no acetyl or propionyl derivatives are formed, and the IIa and IIb are recovered unchanged. Furthermore, when 2 - amino - 3 - pyridinol is reacted with formic acid, again with two equivalents of dicyclohexylcarbodiimide, only unreacted 2-amino-3-pyridinol is recovered. Thus, the reaction of IIa or IIb with formic acid and two equivalents of dicyclohexylcarbodiimide to give IIIa or IIIb, respectively, is a unique reaction.

It has been further found that compounds of the Formula IIa or IIb can be prepared in quantitative yield by an alternative process by reacting a compound of the Formula V with a compound of the Formula VIa or VIb, where X″ is Br or Cl, in a solvent, such as aqueous ethanol, with a reagent like an alkali metal lower alkoxide, e.g., sodium methoxide or sodium ethoxide, as shown in the following equations:

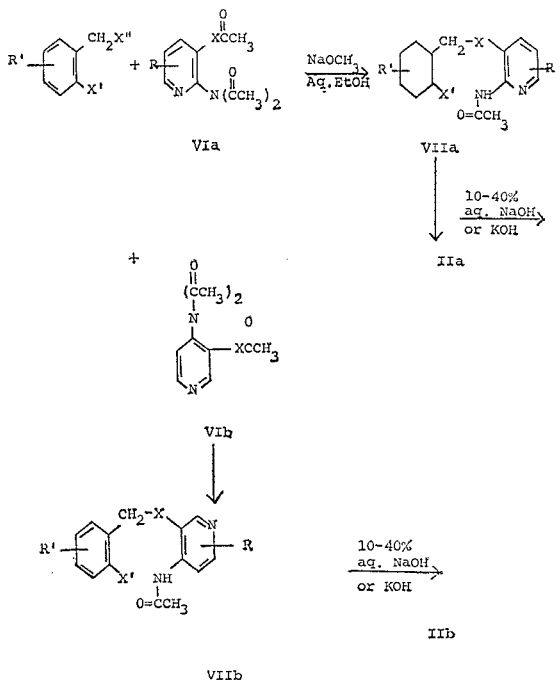

The three acetyl groups are essential since stepwise deacetylation occurs, first allowing the acetyl group at position-3 to be replaced, followed by the loss of one of the two acetyl groups at position-2.

Saponification of the VIIa or VIIb with strong aqueous alkali gives the single tautomers, IIa and IIb, respectively, in quantitative yield.

Thus, by combining the above procedures for preparing IIa and IIb with the formylation procedure employing a reagent like dicyclohexylcarbodiimide, the overall yield of IIIa or IIIb has been increased to about 60%. Compounds IIIa and IIIb may then be cyclized to compounds which are converted to structure I; compounds of the structure IIa or IIb cannot be cyclized, hence N-formylation is a prerequisite for cyclization.

Among the compounds of the Formulas IIa and IIb (in admixture with their tautomeric forms) which can be used can be mentioned 2-amino-3-(2′-bromobenzyloxy)pyridine,
2-amino-3-(2′-chlorobenzyloxy)pyridine,
2-amino-3-(2′,4′-dichlorobenzyloxy)pyridine,
2-amino-3-(2′-bromo-4′-chlorobenzyloxy)pyridine,
2-amino-3-(2′-bromo-4′-trifluoromethylbenzyloxy) pyridine,
2-amino-3-(2′-bromo-5′-methylbenzyloxy)pyridine,
2-amino-2-(2′-bromo-4′-methoxybenzyloxy)pyridine,
2-amino-3(2′-bromo-5′-trifluoromethylbenzyloxy) pyridine,
2-amino-3-(2′-bromo-3′-trifluoromethoxybenzyloxy) pyridine,
2-amino-3-(2′-bromo-4′-trifluoromethylmercaptobenzyloxy)pyridine,
2-amino-3-(2′-bromo-4′-dimethylaminosulfonylbenzyloxy)pyridine,
4-amino-3-(2′-bromobenzyloxy)pyridine,
4-amino-3-(2′-chlorobenzyloxy)pyridine,
4-amino-3-(2′,4′-dichlorobenzyloxy)pyridine,
4-amino-3-(2′-bromo-4′-chlorobenzyloxy)pyridine,
4-amino-3-(2′-bromo-4′-trifluoromethylbenzyloxy)pyridine,
4-amino-3-(2′-bromo-5′-methylbenzyloxy)pyridine,
4-amino-3-(2′-bromo-4′-methoxybenzyloxy)pyridine,
4-amino-3-(2′-bromo-5′-trifluoromethylbenzyloxy)pyridine,
4-amino-3-(2′-bromo-3′-trifluoromethoxybenzyloxy)pyridine,
4-amino-3-(2′-bromo-4′-trifluoromethylmercaptobenzyloxy)pyridine,
4-amino-3-(2′-bromo-4′-dimethylaminosulfonylbenzyloxy)pyridine,
2-amino-3-(2′-bromobenzylthio)pyridine,
4-amino-3-(2′-chlorobenzylthio)pyridine,
2-amino-3-(2′4′-dichlorobenzylthio)pyridine,
2-amino-3-(2′-bromo-4′-chlorobenzylthio)pyridine,
4-amino-3-(2′-bromo-4′-trifluoromethylbenzylthio) pyridine,
2-amino-3-(2′-bromo-5′-methylbenzylthio)pyridine,
2-amino-3-(2′-bromo-4′-methoxybenzylthio)pyridine,
2-amino-3-(2′-bromo-5′-trifluoromethylbenzylthio) pyridine,
2-amino-3-(2′-bromo-3′-trifluoromethoxybenzylthio) pyridine,
2-amino-3-(2′-bromo-4′-trifluoromethylmercaptobenzylthio)pyridine,
2-amino-3-(2′-bromo-4′-dimethylaminosulfonylbenzylthio)pyridine,
2-amino-3-(2′-bromobenzylthio)-5-chloropyridine,
2-amino-3-(2′-bromo-4′-chlorobenzylthio)-5-methylpyridine.

The resulting substantially pure compounds of the Formulas IIa or IIb substantially free of their tautomeric forms of the Formulas IVa and IVb, are then treated with formic acid, under substantially anhydrous conditions, at about 5–30°, in the presence of at least two equivalents of a condensation reagent, such as dicyclohexylcarbodiimide, diisopropylcarbodiimide, dimorpholinylcarbodiimide, carbonyldiimidazole, etc., the reaction preferably being conducted in a polar type of organic solvent, such as ethyl acetate, ethyl formate, methyl propionate, absolute ethanol, N,N-dimethylformamide, or N,N-dimethylacetamide.

Among the compounds of Formula V which can be used can be mentioned 2-bromobenzyl bromide,
2-bromobenzyl chloride,
2-chlorobenzyl bromide,
2,4-dibromobenzyl bromide,
2,5-dichlorobenzyl bromide,
2-bromo-3-fluorobenzyl bromide,
2-bromo-4-methylbenzyl bromide,
2-bromo-6-ethylbenzyl bromide,
2-bromo-3-trifluoromethylbenzyl bromide,
2-bromo-4-trifluoromethylmercaptobenzyl bromide,
2-bromo-3-trifluoromethoxybenzyl bromide and
2-bromo-3-N,N-dimethylaminosulfonylbenzyl bromide.

Among the compounds of Formulas VIa and VIb which can be used can be mentioned 2-diacetylamino-3-pyridinol acetate,
2-diacetylamino-3-pyridinethiol acetate,
2-diacetylamino-4-chloro-3-pyridinol acetate,
2-diacetylamino-5-bromo-3-pyridinol acetate,
2-diacetylamino-6-fluoro-3-pyridinol acetate,
2-diacetylamino-4-methyl-3-pyridinol acetate,
2-diacetylamino-6-n-butyl-3-pyridinol acetate,
2-diacetylamino-5-trifluoromethyl-3-pyridinol acetate,
2-diacetylamino-4-trifluoromethoxy-3-pyridinol acetate,
2-diacetylamino-5-trifluoromethylmercapto-3-pyridinol acetate,
2-diacetylamino-5-N,N-dimethylaminosulfonyl-3-pyridinol acetate,
2-diacetylamino-5-chloro-3-pyridinethiol acetate,
2-diacetylamino-6-fluoro-3-pyridinethiol acetate,
2-diacetylamino-4-ethyl-3-pyridinethiol acetate,
2-diacetylamino-6-n-hexyl-3-pyridinethiol acetate,
2-diacetylamino-5-trifluoromethyl-3-pyridinethiol acetate,
2-diacetylamino-5-trifluoromethoxy-3-pyridinethiol acetate,
2-diacetylamino-5-trifluoromethylmercapto-3-pyridinethiol acetate,
4-diacetylamino-3-pyridinol acetate,
4-diacetylamino-3-pyridinethiol acetate,
4-diacetylamino-2-chloro-3-pyridinol acetate,
4-diacetylamino-5-bromo-3-pyridinol acetate,
4-diacetylamino-6-fluoro-3-pyridinol acetate,
4-diacetylamino-2-methyl-3-pyridinol acetate,
4-diacetylamino-5-trifluoromethyl-3-pyridinol acetate,
4-diacetylamino-6-trifluoromethoxy-3-pyridinol acetate,
4-diacetylamino-5-trifluoromethylmercapto-3-pyridinol acetate,
4-diacetylamino-5-N,N-dimethylaminosulfonyl-3-pyridinol acetate,
4-diacetylamino-5-chloro-3-pyridinethiol acetate,
4-diacetylamino-6-fluoro-3-pyridinethiol acetate,
4-diacetylamino-6-ethyl-3-pyridinethiol acetate,
4-diacetylamino-5-trifluoromethyl-3-pyridinethiol acetate, and
4-diacetylamino-5-trifluoromethoxy-3-pyridinethiol acetate.

In those instances where the compounds of Formulas VIa and VIb are new, they can be prepared by the general method disclosed in Example 2.

The following examples illustrate the invention (all temperatures being in centigrade):

EXAMPLE 1

2-formamido-3-(2'-bromobenzyloxy)pyridine (a) 2-nitro-3-(2'-bromobenzyloxy)pyridine: To 11.6 g. of 85% potassium hydroxide in 100 ml. of 95% ethanol is added slowly 25.0 g. of 3-hydroxy-2-nitropyridine in 100 ml. of 95% ethanol. A yellow-orange solid separates. To this is added 36.5 g. of o-bromobenzyl bromide in 100 ml. of 95% ethanol. The whole is refluxed for 0.5 hour, and 275 ml. of ethanol are distilled under atmospheric pressure. To the residual solution is added with stirring 100 ml. of water, the mixture cooled, the solid filtered and air-dried to give 41.2 g. (74% yield) of product, M.P. 86–88°. This is recrystallized from 285 ml. of 2-propanol to give 32.9 g. (60% yield) of pure product, M.P. 91.5–92.5°.

(b) 2-amino-3-(2'-bromobenzyloxy)pyridine hydrochloride: To a stirred solution of 32.6 g. of the product from (a) in 500 ml. of 2-propanol and 50 ml. of water, heated to 60°, under nitrogen, is added in 10 minute intervals five portions of 12.5 g. of iron powder and 1.3 ml. of concentrated hydrochloric acid. Subsequent to the fifth addition, the mixture is heated under reflux for one hour and filtered hot with suction through a filter mat. To the clear yellow filtrate is added 18 ml. of concentrated hydrochloric acid and the solution concentrated to dryness on the rotary evaporator. The residual yellow solid weighs 32.2 g. (97% yield), M.P. 158–161°. Recrystallization from 500 ml. of acetonitrile gives the pure hydrochloride, 27.7 g. (87% yield), M.P. 172–173° (black).

(c) Isolation of mixture of tautomers: To the product from (b), 27.7 g., suspended by vigorous agitation between 500 ml. of ether and 250 ml. of water, is added, portionwise, 8.4 g. of solid sodium bicarbonate. Subsequently, the mixture is stirred vigorously until no solid remains in either the ether or water phase. The water layer is separated, the ether layer is washed with 50 ml. of saturated aqueous sodium chloride, dried, and concentrated. The residue, 24.5 g. (quantitative yield) is an oil which slowly crystallizes to an oily solid, M.P. about 60–74°. It can be shown that this is a mixture of the tautomers, IVa and IIa, since tedious fractional crystallization separates the oily solid into two crystalline solids, IVa, M.P. 71–73° and IIa, M.P. 107–108°.

(d) Conversion of mixture of tautomers to 2-amino-3-(2-bromobenzyloxy)pyridine: The residue from (c) is redissolved in 500 ml. of ether, 100 ml. of 20% aqueous sodium hydroxide is added, and the mixture agitated vigorously for two hours. The mixture is allowed to settle (emulsions form but these separate eventually and form two phases). The aqueous alkali layer is separated, the ether layer is washed with 50 ml. of saturated aqueous sodium chloride, dried, and concentrated to give 24.5 g. (quantitative yield) of IIa, M.P. 107–108°.

(e) 2 - formamido-3-(2-bromobenzyloxy)pyridine: To the product from Example 1(d), 14.0 g., dissolved with stirring at room temperature in 1 l. of Reagent grade ethyl acetate is added 4.6 g. of 98–100% formic acid and the reaction mixture cooled to 5°. A filtered solution of 20.6 g. of N,N-dicyclohexylcarbodiimide is added in one portion. After stirring for 18 hours, and allowing the reaction mixture to warm to room temperature, the precipitated 20.8 g. of N,N'-dicyclohexylurea is filtered. The filtrate is concentrated to about 20 ml., and the crude solid filtered; the yield of IIIa is 9.2 (60%), M.P. 115–122°. A small amount, recrystallized from ethyl acetate, yields the pure compound, M.P. 135–137°. The ethyl acetate filtrate from the crude product is concentrated to dryness to give 6.0 g. (36%) of the formic acid salt, M.P. 78–80°.

EXAMPLE 2

2-amino-3-(2'-bromobenzyloxy)pyridine (a) 2-(acetylamino)-3-pyridinol acetate: A solution forms promptly when 25.0 g. of 2-amino-3-pyridinol is mixed with 125 ml. of acetic anhydride. The reaction mixture becomes warm, and is not cooled during the reaction. Concentration on the rotary evaporator gives 44.5 g. (quantitative yield) of 2-(acetylamino)-3-pyridinol acetate, M.P. 131–133°.

(b) 2-(diacetylamino)-3-pyridinol acetate: (1) The product from (a), 44.5 g., 200 ml. of acetic anhydride, and 4.4 g. of p-toluenesulfonic acid is heated under reflux for two hours and then concentrated on the rotary evaporator. The residue is triturated with ligroine and then with water to give 54.0 g. (98% yield) of 2-(diacetylamino)-3-pyridinol acetate, M.P. 81–83° after recrystallization from cyclohexane.

(2) 2-amino-3-pyridinol, 25.0 g., ml. of acetic anhydride, and 5.0 g. of p-toluenesulfonic acid are heated under reflux for four hours to give 53.2 g. (96% yield of 2-(diacetylamino)-3-pyridinol acetate, M.P. 81–83°.

(c) 2-acetamido-3-(2'-bromobenzyloxy)pyridine: To a nitrogen diffused solution of 35.5 g. of the product from (b) in 600 ml. of 95% ethanol is added in 0.5 hour, 9.55 g. of sodium methoxide in 200 ml. of absolute ethanol. The pH of the mixture at this point is 9.2. To this solution is added 37.8 g. of o-bromobenzyl bromide in 0.5 hour. The pH is unchanged at 9.2. The mixture is heated rapidly to reflux, heated 10 minutes under reflux (the pH is now 7.4) and poured into 2.5 l. of ice-water. The precipitated solid is filtered and dried to give 49.3 g. (quantitative yield) of product, M.P. 155–157°.

(d) 2 - amino - 3 - (2'-bromobenzyloxy)pyridine: The product from (c), 49.3 g., 750 ml. of 2-propanol, and 100 ml. of 50% aqueous sodium hydroxide is stirred and refluxed for one hour, cooled, allowed to settle, and the lower aqueous alkaline layer separated. The 2-propanol solution is washed with saturated salt solution, the salt solution separated, the 2-propanol solution filtered, and the filtrate concentrated to give 32.8 g. (96% yield) of product, M.P. about 107–108°.

In contrast, when the product from 2(a), 8.8 g., are reacted in 125 ml. of 95% ethanol with 3.1 g. of sodium methoxide in 50 ml. of absolute ethanol, and then with 14.6 g. of o-bromobenzyl bromide, and then the reaction is worked up as in 2(c), it is impossible to isolate good quality 2-acetamido-3-(2'-bromobenzyloxy)pyridine.

EXAMPLE 3

4-formamido-3-(2'-bromobenzylthio)pyridine (a) 4 - nitro - 3 - (2'-bromobenzythio)pyridine: To a solution of 20.3 g. of 3-bromo-4-nitropyridine (prepared by the hydrogen peroxide oxidation of 4-amino-3-bromopyridine), 25.0 g. of o-bromobenzylthiol and 150 ml. of absolute ethanol, is added, dropwise, a solution of 5.4 g. of sodium methoxide in 50 ml. of absolute ethanol, at room temperature. Subsequently, the mixture is stirred and refluxed for two hours to give 4-nitro-3-(2'-bromobenzylthio)pyridine.

(b) 4 - amino-3-(2'-bromobenzylthio)pyridine hydrochloride: By substituting 34.2 g. of the product from (a) for the 2-nitro-3-(2'-bromobenzyloxy)pyridine in Example 1(b), there is obtained 33.1 g. of 4-amino-3-(2'-bromobenzylthio)pyridine hydrochloride.

(c) 4-amino - 3 - (2'-bromobenzylthio)pyridine: The product from (b), 33.0 g., 500 ml. of ether and 100 ml. of 10% aqueous sodium hydroxide are agitated vigorously at room temperature until no solid remains. The ether layer is separated, washed with saturated aqueous sodium chloride, dried, and concentrated to give 4-amino-3-(2'-bromobenzylthio)pyridine.

(d) 4-formamido - 3 - (2'-bromobenzylthio)pyridine: By substituting 14.8 g. of the product from (c) for the 2-amino - 3 - (2'-bromobenzyloxy)pyridine in Example 1(e), there is obtained 4-formamido-3-(2'-bromobenzylthio)pyridine.

EXAMPLE 4

2-formamido-3-(2'-bromo-4'-chlorobenzyloxy)pyridine (a) 2-acetamido - 3 - (2'-bromo-4'-chlorobenzyloxy)pyridine: By substituting 42.7 g. of 2-bromo-4-chlorobenzyl bromide for the o-bromobenzyl bromide in Example 2(c) there is obtained 58.6 g. of 2-acetamido-3-(2'-bromo-4'-chlorobenzyloxy)pyridine.

(b) 2-amino-3-(2'-bromo-4'-chlorobenzyloxy)pyridine: The product from (a), 58.4 g., 750 ml. of 2-propanol, and 100 ml. of 40% aqueous potassium hydroxide are reacted as in Example 2(d) to give 35.2 g. of 2-amino-3-(2'-bromo-4'-chlorobenzyloxy-pyridine.

(c) 2-formamido - 3 - (2'-bromo-4'-chlorobenzyloxy)pyridine: To 16.0 g. of the product from (b) in 1 l. of Reagent grade ethyl formate is added 4.6 g. of 98–100% formic acid, the mixture cooled to 5°, and a filtered solution of 20.6 g. of N,N-dicyclohexylcarbodiimide added in one portion. Workup as in Example 1(e) gives 2-formamido-3-(2'-bromo-4'-chlorobenzyloxy)pyridine.

EXAMPLE 5

2-amino-3-[2'-bromo-4'-(trifluoromethyl)benzyloxy]-pyridine (a) 2-bromo-4-(trifluoromethyl)benzyl bromide: 4-(trifluoromethyl) toluene, 32.0 g. and 1.0 g. of iron filings are rapidly agitated, warmed to 40°, and treated slowly with a total of 32.0 g. of bromine during 2 hours. The mixture is purged with nitrogen and filtered to give 2-bromo-4-(trifluoromethyl)toluene. The filtrate is heated to 110°, irradiated with an ultraviolet lamp, 1.0 g. of benzoyl peroxide is added, and 32.0 g. of bromine are added during 2 hours. The colorless mixture is purged with nitrogen. Analyses indicates that the product contains approximately 70% of 2-bromo-4-(trifluoromethyl)-benzyl bromide.

(b) 2-nitro-3-[2'-bromo-4'-trifluoromethyl)benzyloxy]pyridine: In Example 1(a), by substituting 57.7 g. of the product from (a) for the o-bromobenzyl bromide in that example, there is obtained 2-nitro-3-[2'-bromo-4'-(trifluoromethyl)benzyloxy]pyridine.

(c) 2 - amino-3-(2' - bromo-4'-(trifluoromethyl)benzyloxy)pyridine hydrochloride: By substituting 37.7 g. of the product from (c) for the 2-nitro-3-(2'-bromobenzyloxy)pyridine in Example 1(b) there is obtained 31.7 g. of 2 - amino-3-(2'-bromo-4'-(trifluoromethyl)benzyloxy)pyridine hydrochloride.

(d) 2 - amino-3-(2'-bromo-4'-(trifluoromethyl)benzyloxy)pyridine: By substituting the product from (c), 31.5 g., for the 4-amino-3-(2'-bromobenzyloxy)pyridine hydrochloride in Example 3(b), there is obtained 2-amino-3-[2'-bromo-4'-(trifluoromethyl)]pyridine.

EXAMPLE 6

2-amino-3-(2'-bromobenzylthio)-5-chloropyridine (a) 2-amino-3-bromo-5-chloropyridine: The vapor phase bromination of 200° of 2-amino-5-chloropyridine gives 2-amino-3-bromo-5-chloropyridine.

(b) 2-amino-5-chloro-3-pyridinethiol: The product from (a), 20.8 g., 6.2 g. of sodium hydrosulfide, and 100 ml. of ethylene glycol are stirred and heated at 180° for four hours to give 21.2 g. of 2-amino-5-chloro-3-pyridinethiol.

(c) 2-(diacetylamino)-5-chloro-3-pyridinethiol acetate: The product from (a), 21.0 g., 200 ml. of acetic anhydride, and 3.0 g. of p-toluenesulfonic acid are heated under reflux for four hours and concentrated on the rotary evaporator to give 2-(diacetylamino)-5-chloro-3-pyridinethiol acetate.

(d) 2-acetamido-3-(2'-bromobenzylthio)-5-chloropyridine: By substituting 37.8 g. of the product from (c) for the 2-(diacetylamino)-3-pyridinol acetate in Example 2(c), there is obtained 52.7 g. of 2-acetamido-3-(2'-bromobenzylthio)-5-chloropyridine.

(e) 2-amino-3-(2'-bromobenzylthio)-5-chloropyridine: The product from (d), 52.5 g., substituted for the 2-acetamido-3-(2'-bromobenzyloxy)pyridine in Example 2(d), gives 2 - amino-3-(2'-bromobenzylthio)-5-chloropyridine.

EXAMPLE 7

6,11-dihydropyrido[2,3-b][4,1]-benzoxazepine-11-carboxaldehyde

A mixture of 3.4 g. of 1(e), 7.2 g. of dried, anhydrous K₂CO₃, 0.3 g. of Cu bronze, and 80 ml. of Dowtherm A is vigorously stirred under nitrogen at an internal temperature of 155–160° for 2 hours. After filtering, the solvent is distilled in vaco leaving an oily residue which solidifies upon the addition of a few drops of hexane. The yield of product is 2.3 g. (92%), M.P. about 150–153°, after recrystallization from hexane.

EXAMPLE 8

6,11-dihydropyrido[2,3-b][4,1]-benzoxazepine

The product from Example 7 is dissolved in 35 ml. of 95% ethanol, 3.5 ml. of 50% sodium hydroxide, and 3.5 ml. of water and the whole is refluxed for 1 hour. After concentration, the semisolid residue is dissolved in 100 ml. of Reagent grade benzene and chromatographed on 80 g. of 80–200 mesh activated alumina prepared in 180 ml. of benzene. The first three eluates of 250, 50, and 50 ml. of benzene yield only Dowtherm A; the fourth eluate of 250 ml. of 2-propanol gives 1.8 g. (79% yield) of product, M.P. about 110–113°, after recrystallization from hexane.

EXAMPLE 9

6,11-dihydropyrido[4,5-b][4,1]benzothiazepine-11-carboxaldehyde

By substituting 3.6 g. of 3(d) for the 1(e) in Example 7, there is obtained 6,11-dihydropyrido[4,5-b][4,1]benzothiazepine-11-carboxaldehyde.

EXAMPLE 10

2-amino-3-(2'-bromo-4'-chlorobenzylthio)-5-methylpyridine (a) 2-amino-3-bromo-5-methylpyridine: The vapor phase bromination of 200° of 2-amino-5-methylpyridine gives 2-amino-3-bromo-5-methylpyridine.

(b) 2-amino-5-methyl-3-pyridinethiol: By substituting 18.3 g. of the product from (a) for the 2-amino-3-bromo-5-chloropyridine in Example 6(b), there is obtained 17.3 g. of 2-amino-5-methyl-3-pyridinethiol.

(c) 2-(diacetylamino)-5-methyl - 3 - pyridinethiol acetate: A mixture of 28.6 g. of the product from (b), 150 ml. of acetic anhydride, and 2.5 g. of p-toluenesulfonic acid are heated under reflux for three hours and then concentrated to dryness on the rotary evaporator. The residue is extracted with 500 ml. of cyclohexane, filtered, and the filtrate cooled to give 2-(diacetylamino)-5-methyl-3-pyridinethiol acetate.

(d) 2-acetamido-3-[2'-bromo - 4' - chlorobenzylthio)-5-methylpyridine: By substituting 40.4 g. of the product from (c) for the 2-(diacetylamino)-3-pyridinol acetate and 42.7 g. of 2-bromo-4-chlorobenzyl bromide prepared by the bromination in the presence of iron filings at 40° of p-chlorotoluene to 2-bromo-4-chlorotoluene, followed by allylic bromination of the latter compound at 110° in the presence of ultraviolet light, for the 2-bromobenzyl bromide in Example 2(c), there is obtained 2-acetamido-(2'-bromo-4'-chlorobenzylthio)pyridine.

(e) 2-amino - 3 - (2'-bromo - 4' - chlorobenzylthio)-5-methylpyridine: The product from (d), 54.5 g., substituted for the 2-acetamido-3-(2'-bromobenzyloxy)pyridine in Example 2(d) gives 2-amino-3-(2'-bromo-4'-chlorobenzylthio)-5-methylpyridine.

EXAMPLE 11

2-amino-3-[4-(N,N-dimethylaminosulfonyl)benzyloxypyridine (a) 2-bromo - 4 - (N,N - dimethylaminosulfonyl)toluene: The iron catalyzed bromination of N,N-dimethyl-p-toluenesulfonamide at 40° gives 2-bromo-4-(N,N-dimethylaminosulfonyl)toluene.

(b) 2-bromo - 4 - (N,N-dimethylaminosulfonyl)benzyl bromide: The allylic bromination, at 110°, in the presence of catalytic amounts of benzoyl peroxide, of the product from (a) gives 2-bromo-4-(N,N-dimethylaminosulfonyl) benzyl bromide.

(c) 2-acetamido - 3 - [2'-bromo-4'-(N,N-dimethylaminosulfonyl)benzyloxy]pyridine: When the procedure of Example 2(c) is modified so that 53.5 g. of the product from (b) is employed in place of the o-bromobenzyl bromide in that example, there is obtained 2-acetamido-3-[2'-bromo - 4' - (N,N-dimethylaminosulfonyl)benzyloxy]pyridine.

(d) 2-amino - 3 - [2' - bromo-4'-(N,N-dimethylaminosulfonyl)benzyloxy]pyridine: The product from (c), 42.7 g., 500 ml. of 2-propanol and 75 ml. of 50% aqueous sodium hydroxide are stirred and refluxed for one hour, cooled, the lower aqueous alkali layer separated, the 2-propanol solution washed with saturated aqueous sodium chloride, dried, and concentrated to give 37.4 g. of 2-amino - 3 - [2' - bromo-4'-(N,N-dimethylaminosulfonyl)benzyloxy]pyridine.

In a similar manner, by substituting the appropriate starting material and following the procedures in the foregoing examples, all other compounds of this invention can be prepared.

What is claimed is:

1. In a process for preparing formamide of the formula

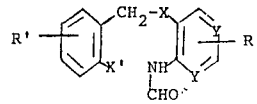

wherein X is oxy or thio; one Y is aza and the other Y is

R and R' are the same or different and represent hydrogen, halogen, lower alkyl, lower alkoxy, trifluoromethyl, trifluoromethylmercapto, trifluoromethoxy or N,N-dimethylaminosulfonyl; and X' is chloro or bromo, wherein a corresponding amine of the formula

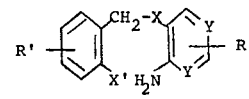

wherein X, Y, R, R' and X' are as above defined, is treated with formic acid, the improvement which consists of treating the amine with formic acid under substantially anhydrous conditions in the presence of at least two equivalents of a condensation reagent selected from the group consisting of dicyclohexylcarbodiimide, diisopropylcarbodiimide, dimorpholinylcarbodiimide or carbonyldiimidazole.

2. The process of claim 1, wherein the condensation reagent is dicyclohexylcarbodiimide.

3. The process of claim 1, wherein the amine in admixture with its tautomer of the formula

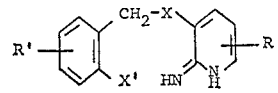

or

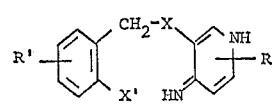

wherein X, R, R' and X' are as defined in claim 1, is first treated with a strong aqueous alkali to convert said tautomer to said amine.

References Cited

UNITED STATES PATENTS 3,123,614  3/1964  Yale et al. _____ 260—296 R

ALAN L. ROTMAN, Primary Examiner

U.S. Cl. X.R.

260—294.8 G, 295 AM, 296 R

PO-1050
(5/69)

UNITED STATES PATENT OFFICE
CERTIFICATE OF CORRECTION

Patent No. 3,644,378             Dated February 22, 1972

Inventor(s) Harry Louis Yale and Jelka Pluscec

It is certified that error appears in the above-identified patent and that said Letters Patent are hereby corrected as shown below:

Column 4, line 5, "2-amino-2" should read --2-amino-3--.
Column 6, line 63, "25.0 g., ml." should read --25.0 g., 200 ml.--. Column 7, line 21, "bromobenzythio" should read --bromobenzylthio--. Column 7, line 60, "chlorobenzyloxy-" should read --chlorobenzyloxy)- --. Column 8, line 61, "vaco" should read -- vacuo--.

Signed and sealed this 3rd day of October 1972.

(SEAL)
Attest:

EDWARD M. FLETCHER, JR.
Attesting Officer

ROBERT GOTTSCHALK
Commissioner of Patents